Oct. 26, 1943.     T. RAPP     2,332,600
VIBRATING CONVEYER TROUGH
Filed Sept. 8, 1941     2 Sheets-Sheet 1
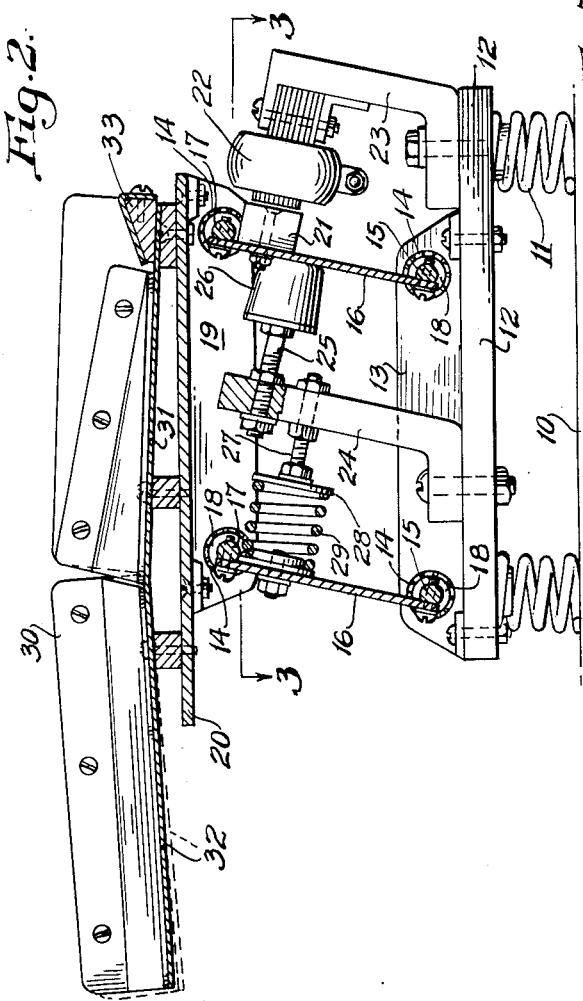
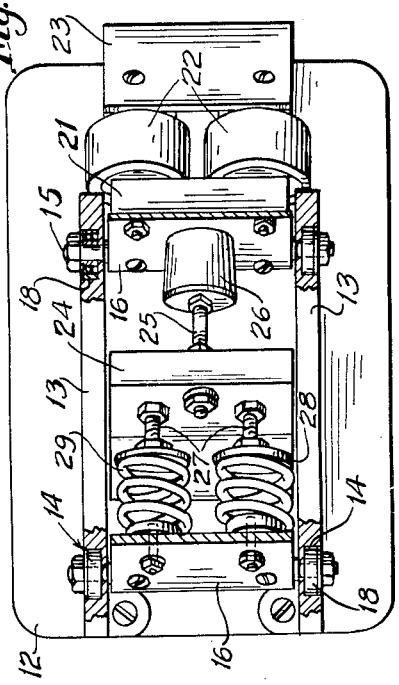
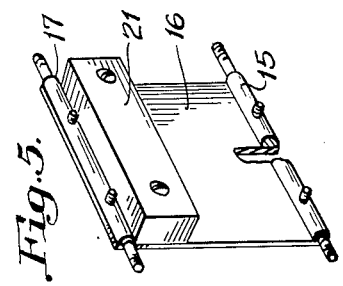
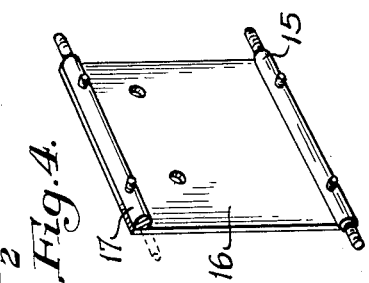
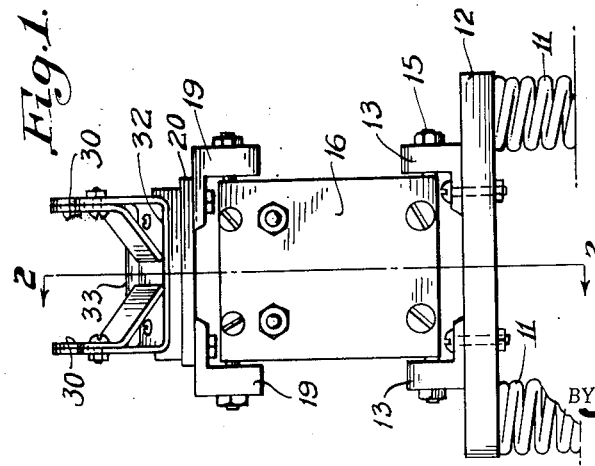
INVENTOR.
Theodore Rapp
BY
ATTORNEY.

Oct. 26, 1943.  T. RAPP  2,332,600
VIBRATING CONVEYER TROUGH
Filed Sept. 8, 1941   2 Sheets-Sheet 2
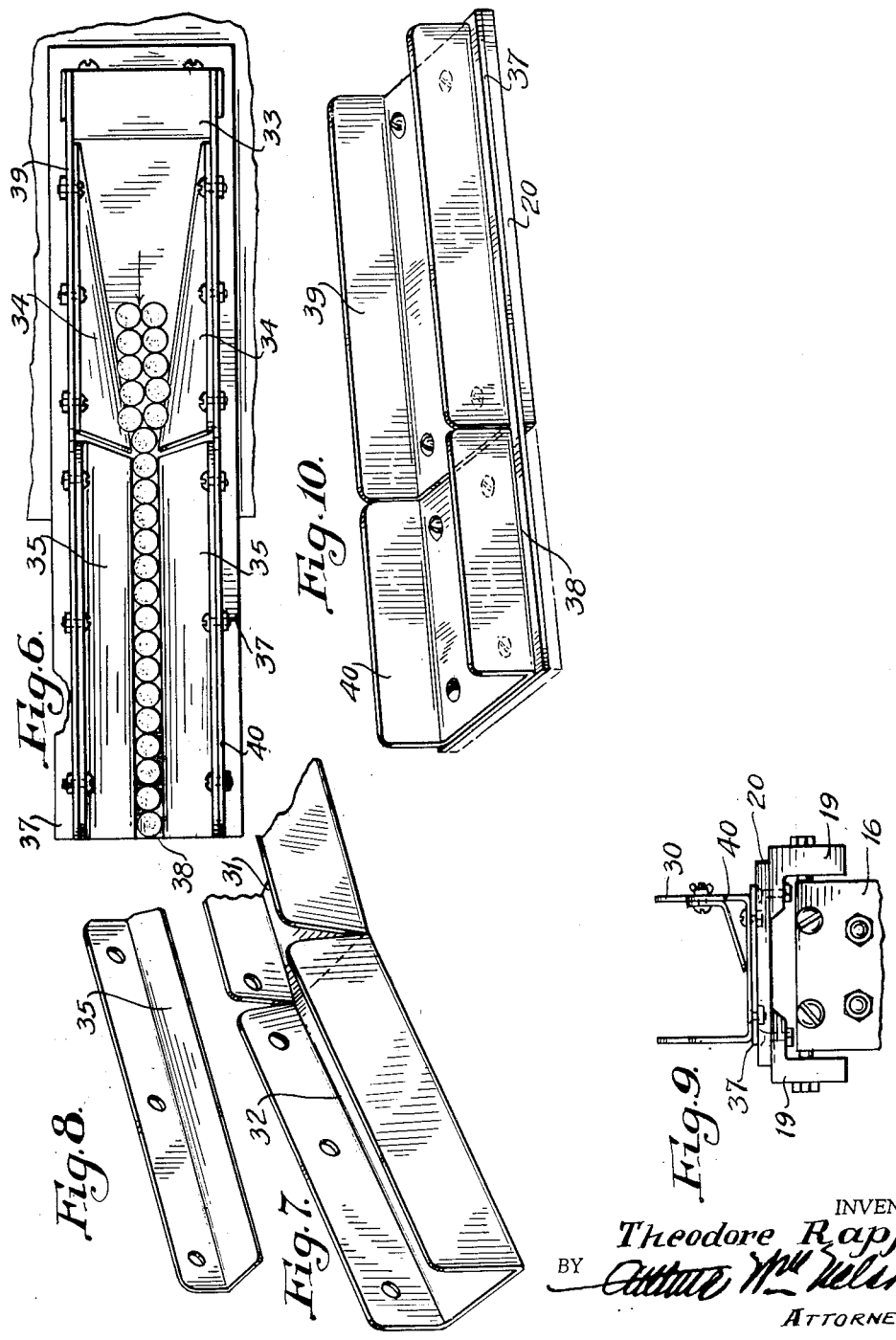
INVENTOR.
Theodore Rapp
BY
ATTORNEY.

Patented Oct. 26, 1943

2,332,600

UNITED STATES PATENT OFFICE 2,332,600

VIBRATING CONVEYER TROUGH

Theodore Rapp, Los Angeles, Calif., assignor, by mesne assignments, to L. R. Muskat, Peter Muskat, Delbert Muskat, Nina L. Muskat, and Edna C. Muskat, collectively, doing business as Triangle Package Machinery Co., Chicago, Ill.

Application September 8, 1941, Serial No. 409,927

9 Claims. (Cl. 198—220)

My invention relates to a vibrating conveyer trough and has for its principal object the provision of a relatively simple, practical and inexpensive conveyer trough and vibrating means therefor and which trough and vibrator are particularly applicable for use in connection with automatic weighing and packaging machines of the particular type disclosed in U. S. Letters Patent No. 2,101,561, issued to me December 7, 1937, also the inventions forming the subject matter of my copending application for patent filed July 27, 1938, Serial No. 221,575, now Patent No. 2,266,906, granted December 23, 1941, and application filed September 16, 1939, Serial No. 295,280, now Patent No. 2,270,083, granted January 13, 1942.

Further objects of my present invention are, to generally improve upon and simplify the construction of the conveyer troughs and vibrating means therefor disclosed in my aforesaid issued patent and pending patent applications, to provide improved means for imparting positive vibratory movement to a conveyer trough, which vibrating means comprises one or more substantially non-flexible plates for supporting the trough that is to be vibrated, with the ends of said plates mounted on anti-friction bearings that provide the necessary movement for the vibratory trough and which construction eliminates the necessity for mounting the trough on relatively thin plates of resilient material.

Further objects of my invention are, to construct the vibratory conveyer trough so that the travel of the product therethrough is controlled and regulated so as to attain increased accuracy of the product that discharges from the trough into the containers that are supported by a weighing mechanism, thus insuring the delivery of the same number of pieces of the product passing through the trough or uniform weight of the amounts of product delivered into the receptacles and further, to provide a vibrating conveyer trough that is particularly efficient in the handling of a product wherein the individual pieces or particles tend to interlock or hand together.

A further object of my invention is to construct a conveyer trough actuated by a single vibrating means so that during vibration the product passing through the trough is caused to travel at different speeds through different portions of the trough.

A further object of my invention is, to provide a vibrating conveyer trough for causing the small individual pieces or particles of a product, for instance, medicinal tablets, or the like, to travel in a single row through the forward portion of the trough and to discharge one at a time from the forward end of said trough, thus enabling a predetermined number of individual pieces or particles of the product to be delivered into the receptacles or containers in which the product is packaged.

Further objects of my invention are, to provide adjustable resilient means for controlling the vibratory movement imparted to the trough and its support, to provide means for maintaining the vibrating plates that support a trough in proper angular positions and further, to provide a cushioned stop for limiting the forward movement of the vibrating plates that support the trough.

With the foregoing and other objects in view, my invention consists in certain novel features of construction and arrangement of parts that will be hereinafter more fully described and claimed and illustrated in the accompanying drawings in which:

Fig. 1 is a front elevational view of a vibrating conveyer trough constructed in accordance with my invention.

Fig. 2 is a vertical longitudinal section taken on the line 2—2 of Fig. 1.

Fig. 3 is a horizontal section taken on the line 2—2 of Fig. 2.

Figs. 4 and 5 are perspective views of the substantially upright trough supporting plates.

Fig. 6 is a plan view of a form of the vibrating trough utilized for the conveying and handling of relatively small objects such as tablets, small nuts, screws, washers, or any product made up of small individual pieces or particles.

Fig. 7 is a perspective view of the main body portion of the trough with a part broken away.

Fig. 8 is a perspective view of a deflector and guiding plate that is removably positioned in a part of the trough.

Fig. 9 is an end elevational view of the trough and showing a combined guiding and deflecting plate positioned therein.

Fig. 10 is a perspective view of a modified form of the trough.

Referring by numerals to the accompanying drawings and particularly to the construction illustrated in Figs. 1 to 7 inclusive, 10 designates a fixed base or platform and positioned thereupon are coiled springs 11 that provide a resilient support for a base plate 12. Projecting upwardly from base plate 12 are longitudinally disposed parallel ribs 13 and arranged in the end portions thereof are conventional anti-friction bearings 14 for the end portions of transversely disposed shafts 15. Secured to the shafts 15 are the lower ends of non-flexible plates 16, preferably of metal, which are inclined slightly in the same direction so as to occupy parallel inclined planes.

The upper ends of these plates 16 are suitably secured to transversely disposed rods 17, the end portions thereof being arranged in conventional anti-friction bearings 18 and the latter being mounted for operation in parallel ribs 19 that depend from the under side of a horizontally disposed trough-carrying plate 20.

Suitably secured to the upper portion of the rear one of the vibrating plates 16 is an armature 21 and positioned immediately to the rear of said armature is an electromagnet 22. This magnet is supported on the upper portion of a bracket 23 that is secured to and projects upwardly from the rear portion of plate 12.

Secured to and projecting upwardly from plate 12 between the shafts 15 is a bracket 24 and adjustably seated in the upper portion thereof is a rearwardly projecting rod 25 carrying on its rear end a small block or button 26 of rubber, the rear face of which normally makes contact with the front face of the rear one of the vibrating plates 16.

Adjustably seated in bracket 24 just below rod 25 is the rear portion of a forwardly projecting rod 27, the forward end of which carries a plate 28, the same providing a support for the rear end of an expansive spring 29 and the forward portion of this spring bears against the upper rear face of the forward one of the plates 16.

Suitably secured to and supported upon plate 20 is a trough 30, preferably formed of sheet metal and which is substantially U-shape in cross section. This trough is shaped so that its central portion is slightly higher than its end portions and thus the rear portion 31 of the bottom of the trough gradually inclines from its rear end upwardly toward its forward end and the forward portion 32 of the bottom gradually declines from the high forward end of portion 31 toward the forward end of the trough.

As a result of the construction just described, the product that passes lengthwise through the trough while the same is vibrating moves at relatively slow speed during its movement forwardly on the inclined rear portion 31 of the bottom of said trough and said material moves at increased speed as it traverses the declining front portion 32 of the bottom of the trough.

Arranged on the bottom of the trough at the rear end thereof is a transversely disposed barrier 33 that prevents material delivered into the rear portion of the trough from discharging from the rear end thereof.

In the operation of the vibrating trough constructed as described, the energization of the coil of magnet 22 acts through the magnet core to attract armature 21, thereby drawing the upper end of the rear one of the plates 16 a slight distance rearwardly and imparting corresponding rearward movement to plate 20 on which the trough is mounted, also to the forward one of the trough supporting plates 16.

During this slight rearward movement of the trough carrying plate 20, such movement is yieldingly resisted and cushioned by coil spring 29, and the transverse rods 15 and 17 which are connected to the upper and lower ends of the plates 16 rock in their anti-friction bearings 14 and 18, such rocking movement being necessarily slight due to the short distance traveled by the trough-carrying plate 20. As the direction of current flow through the coil of the magnet changes, spring 29 acts to swing the forward one of the plates 16 a short distance forwardly, which movement is transmitted to trough-carrying plate 20 and the rear one of the plates 16, and such forward movement is cushioned and yieldingly stopped by rubber block or button 26. Thus the trough-carrying plate is rapidly vibrated and as the plates 16 are supported at both ends with anti-friction bearings, there will be no flexing of said plates.

The product to be conveyed and handled by the trough is discharged by suitable means, preferably a chute or hopper, into the rear portion of the trough, just in front of the barrier 33, and as the trough continues to vibrate this material will be moved forwardly through the rear portion of the trough which has the upwardly inclined bottom 31 and said product will finally pass into the forward portion of the trough having the bottom 32 that declines toward its forward end and owing to the conformation of the bottom of the trough throughout its length, the product will have a relatively slow forward speed through the rear portion of the trough due to the inclination of the bottom 31 and said product will have a relatively faster flow or travel through the forward portion of the trough or that portion having the bottom 32 that declines toward its forward end.

Where the vibrating trough is utilized for handling certain products having individual pieces of the same weight and where it is desired to deliver the same number of pieces of the product into the receptacles, the product may be caused to automatically arrange itself so as to travel in a single row by the use of deflectors or guide plates as illustrated in Fig. 6.

Positioned in the rear portion of the trough or that portion having the bottom that inclines toward its forward end are inclined deflecting walls or panels 34, preferably formed of sheet metal and having their straight vertically disposed upper portions detachably secured to the side walls of the trough by screws or the like.

The lower portions of these deflecting walls are inclined from the side walls downwardly toward the inclined bottom wall 31 and these inclined portions gradually increase in width toward their forward ends so that the exposed face of the rear portion 31 of the trough gradually decreases in width toward its forward end.

Thus the individual pieces of the product that is delivered into the rear portion of the trough will, as the said trough vibrates, be moved forwardly and toward each other so that the pieces of product pass forwardly one at a time from between the forward ends of the deflectors.

The single row of individual pieces of the product that discharge from between the forward ends of the deflectors 34 are caused to travel in a single row through the forward portion of the trough or that portion having the bottom 32 that declines toward its forward end as a result of the use of inclined deflectors 35, the upper vertical portions of which are secured to the side walls of the trough and the lower inclined portions being disposed between said side walls and the bottom of said trough.

This automatic handling of individual pieces of a product so that the same are caused to move through the forward portion of the trough in a single row is made possible by reason of the fact that the individual pieces of product travel at increased speed through the forward portion of the trough with respect to those pieces of the product that are traveling more slowly through the rear portion of the trough or that portion having the bottom that gradually inclines upwardly from the point where it merges with the rear end of the portion 32 of the bottom that gradually declines toward its forward end.

Rod 27 carrying plate 28 that bears against spring 29 is adjustably seated in bracket 24 in order that the tension of said spring may be varied and thereby accurately regulate the vibratory movement that is imparted to the trough carrying member 20 and rod 25 that carries the rubber block or button 26 is adjustably seated in bracket 24 so as to provide a cushioned stop for maintaining the plates 16 in parallel relation with each other and with the bracket 24.

In Fig. 8 I have illustrated one of the inclined deflectors 35 that is positioned in the forward portion of the trough for accomplishing the single row travel of the product as just described.

In Fig. 10 I have illustrated a modified form of the trough that is particularly applicable for use in the conveying and handling of products wherein the individual pieces tend to interlock or hang together, for instance, noodles, potato chips, pretzels, and other irregular shaped products, also for nuts, bolts, screws, lock washers, and the like.

In this construction, the rear portion of a plate 37, preferably of thin, resilient sheet metal, is mounted on plate 20 with a substantial portion 38 of said resilient plate projecting forwardly from the forward end of said plate 20. Secured in position on the rear portion of plate 37 or that portion that overlies plate 20 is a trough 39, preferably formed of sheet metal, and which is U-shape in cross section. Mounted on the forwardly projecting portion 38 of plate 37 is a trough 40, preferably formed of sheet metal, and which is U-shape in cross section.

When this form of trough is in service and plate 20 is vibrated as hereinbefore described, the trough 39 carried by plate 20 will be vibrated longitudinally to effect a forward movement of the product delivered into the rear portion of said trough and trough 40 mounted on the projecting portion 38 of resilient plate 37 will be vibrated vertically simultaneously with its longitudinal vibration, with the result that the product as it passes through trough 40 will be vibrated vertically simultaneously with its forward movement and which double vibration is very effective in separating the individual pieces of product from each other prior to their discharge from the forward end of the trough. This action is particularly desirable inasmuch as it brings about greater accuracy and uniformity of weight of the product delivered into the containers.

This construction may be utilized for controlling the flow of the product through the trough and its discharge from the forward end thereof, and the width of the inclined portion of the deflector may be varied in accordance with the product that is being handled by the trough.

Thus it will be seen that I have provided a vibrating conveyor trough that is relatively simple in construction, inexpensive of manufacture and very effective in performing the functions for which it is intended.

It will be understood that minor changes in the size, form and construction of the various parts of my improved vibrating conveyer trough, may be made and substituted for those herein shown and described, without departing from the spirit of my invention, the scope of which is set forth in the appended claims.

I claim as my invention:

1. In a vibrating conveyer, a trough having a continuous bottom composed of front and rear portions connected together by a junction portion and sloping downwardly in opposite directions therefrom so that when the conveyer is vibrated, the force of gravity acts to resist movement of the particles on said rear portion to a greater extent than it does to resist movement of the particles on the front portion whereby feed along the front portion is relatively faster than along the rear portion.

2. In a vibrating conveyer, a trough having a continuous bottom composed of front and rear portions connected together by a junction portion and sloping downwardly in opposite directions therefrom, the rear portion being so disposed relative to the horizontal and to the front portion that when the conveyer is vibrated the force of gravity acts to resist movement of the particles on said rear portion to a greater extent than it does to resist movement of the particles on the front portion whereby feed along the front portion is relatively faster than along the rear portion.

3. In a vibrating conveyer, a trough as set forth in claim 1, with means for vibrating said trough.

4. In a vibrating conveyer, a trough having sidewalls and a bottom, the latter being continuous in length and including end portions extending downwardly in opposite directions and at different angles to the horizontal from its mid portion, means for vibrating the trough, and with deflectors arranged in the trough and having parts associated with both end portions of the bottom, the deflector parts associated with one of said end portions defining a guide passage with parallel sides and the deflector parts associated with the other of said end portions defining a guide passage that converges toward one end to line up with one end of the first mentioned passage, as and for the purpose specified.

5. In a vibrating conveyer, a trough having front and rear portions, means for vibrating the trough, and with means within both portions of the trough for causing the individual pieces of the product in the rear portion of the trough to adjust themselves to enter and travel in a single row through the front portion of said trough.

6. In a vibrating conveyer, a trough having a continuous bottom, means for vibrating the trough, the rear portion of the bottom of which trough is upwardly inclined from the horizontal in the direction of travel of product through said trough, the front portion of said bottom declining downwardly from the horizontal in the direction of travel of product through the trough, and means within the trough for directing the travel of the product through said trough in the vibration thereof.

7. In a vibrating conveyer trough, a base, relatively rigid members mounted for rocking movement on said base, a plate supported by the upper portions of said members, a trough carried by said plate, bars fixed to the top and bottom of said rigid members and having end portions extending therebeyond, means in said base and in said trough supporting plate respectively and in which the end portions of said bars have bearing engagement for a rocking movement, and means for imparting vibratory movement to said relatively rigid members and said trough-carrying plate.

8. In a vibrating conveyer trough, a base, relatively rigid members mounted for rocking movement on said base, a plate supported by the upper portions of said members, a trough carried by said plate, anti-friction bearings carried by said base and said plate respectively and with which trunnions on the top and bottom ends of said rigid members are engaged, and means for imparting vibratory movement to said rigid members and said trough-carrying plate.

9. A vibrating conveyer trough as set forth in claim 7 and with means for cushioning the vibratory movement imparted to said relatively rigid members.

THEODORE RAPP.